United States Patent
Joubaud et al.

(10) Patent No.: US 8,168,552 B2
(45) Date of Patent: May 1, 2012

(54) METHOD OF REFINING GLASS AND PRODUCT OBTAINED

(75) Inventors: Laurent Joubaud, Paris (FR); Dorothee Martin, Suresnes (FR)

(73) Assignee: Saint-Gobain Glass France, Courbevoie (FR)

( * ) Notice: Subject to any disclaimer, the term of this patent is extended or adjusted under 35 U.S.C. 154(b) by 136 days.

(21) Appl. No.: 12/097,761

(22) PCT Filed: Oct. 9, 2006

(86) PCT No.: PCT/FR2006/051002
§ 371 (c)(1),
(2), (4) Date: Jun. 17, 2008

(87) PCT Pub. No.: WO2007/074248
PCT Pub. Date: Jul. 5, 2007

(65) Prior Publication Data
US 2008/0269039 A1    Oct. 30, 2008

(30) Foreign Application Priority Data
Dec. 22, 2005   (FR) ..................... 05 54043

(51) Int. Cl.
*C03B 5/18*   (2006.01)
*C03C 3/076*  (2006.01)

(52) U.S. Cl. ............... 501/27; 501/65; 501/66; 501/67; 501/69; 501/70; 65/134.1; 65/134.3; 65/134.5

(58) Field of Classification Search ............... 65/134.1, 65/134.3, 134.5; 501/27–31, 65–67, 69, 501/70
See application file for complete search history.

(56) References Cited

U.S. PATENT DOCUMENTS

| | | | |
|---|---|---|---|
| 3,511,629 A | | 5/1970 | Bauer et al. |
| 3,589,885 A | | 6/1971 | Monks |
| 3,622,296 A | | 11/1971 | Buehl |
| 4,106,946 A | * | 8/1978 | Ritze ............... 501/55 |
| 5,013,487 A | * | 5/1991 | Cheng ............. 252/587 |
| 5,069,826 A | | 12/1991 | Cheng |
| 5,350,717 A | * | 9/1994 | Day et al. ............ 501/7 |
| 5,656,559 A | * | 8/1997 | Combes et al. ...... 501/70 |
| 5,830,814 A | * | 11/1998 | Combes ............. 501/70 |
| 5,837,629 A | * | 11/1998 | Combes et al. ...... 501/70 |
| 6,468,933 B1 | * | 10/2002 | Narita et al. ....... 501/56 |
| 6,508,083 B1 | * | 1/2003 | Naka et al. ........ 65/134.3 |
| 7,049,255 B2 | * | 5/2006 | Oyama et al. ....... 501/64 |
| 2006/0084562 A1 | * | 4/2006 | Oyama et al. ...... 501/66 |
| 2008/0131628 A1 | * | 6/2008 | Abensour et al. .... 428/34 |

FOREIGN PATENT DOCUMENTS

| | | | |
|---|---|---|---|
| DE | 197 47 896 | | 5/1998 |
| EP | 592237 | * | 4/1994 |
| EP | 0 960 075 | | 12/1999 |
| FR | 2727399 | * | 5/1996 |
| GB | 1 423 025 | | 1/1976 |
| JP | 2003171141 | * | 6/2003 |
| SU | 1008173 | * | 3/1983 |

OTHER PUBLICATIONS
U.S. Appl. No. 12/447,300, filed Apr. 27, 2009, Martin et al.

* cited by examiner

*Primary Examiner* — Karl Group
(74) *Attorney, Agent, or Firm* — Oblon, Spivak, McClelland, Maier & Neustadt, L.L.P.

(57) ABSTRACT

The subject of the invention is a method of refining glass for which the temperature (T log 2) corresponding to a viscosity of 100 poise (10 Pa·s) is greater than or equal to 1480° C., characterized in that sulfides are used as a refining agent. It also relates to the glass article capable of being obtained by this method.

9 Claims, No Drawings

METHOD OF REFINING GLASS AND PRODUCT OBTAINED

The invention relates to the field of refining glass, especially glass that has a high melt viscosity.

The quality of the glass is a major preoccupation of glass manufacturers, especially manufacturers of flat glass, and in the various steps of the glass manufacture, refining is a fundamental step. This operation consists in eliminating, as much as possible, the gaseous inclusions of various sizes, known as "blisters", bubbles or "seeds", whose presence in the final product is usually tightly controlled and sometimes unacceptable. Thus, the quality requirements in terms of refining are very strict for automotive applications (especially windshields, which must provide perfect visibility), and even stricter for the applications of flat glass in the electronics field, especially as substrates for flat screens such as liquid crystal displays (LCDs), the presence of gaseous inclusions possibly then disturbing the electrical operation and/or deforming certain pixels that constitute the image.

These gaseous inclusions have several origins. They mainly come from air trapped between the grains of pulverulent materials and from degassing due to certain chemical reactions that occur during the glass-melting step. Thus, the carbonate-based batch materials (such as, for example, sodium carbonate, limestone or dolomite) release large amounts of carbon dioxide in gas form. The gaseous inclusions may also be due to desolubilization reactions of certain gases under certain conditions, or to chemical or electrochemical reactions between the molten glass and certain materials present in the furnaces (refractory ceramics and/or metals). The gaseous inclusions are trapped within the mass of molten glass, from which they can escape at a rate proportional to the square of their diameter. Thus, small bubbles (sometimes known as "seeds") can escape only at very low rates. The rate of rise of bubbles may furthermore be slowed down by the viscosity of the glass and by convective movements that may entrain the bubbles toward the floor of the furnace.

The various refining methods that exist all have the common characteristic of trying to increase the rate of movement of the bubbles in the glass and/or of reducing the height of glass so as to shorten the path of the bubbles toward the atmosphere of the furnace.

Usually, a chemical refining operation is carried out: a chemical compound, known as a refining agent and normally introduced with the batch materials, produces an intense evolution of gas in the molten glass, the large bubbles thus formed coalescing with the small bubbles and carrying them away more rapidly to the surface.

The refining of soda-lime-silica glass, which represents the majority of the glass produced on an industrial scale, is usually carried out with the aid of sulfates. A source of sulfates, generally sodium sulfate ($Na_2SO_4$) or gypsum ($CaSO_4$), is introduced with the batch materials which, at high temperature, produces a gaseous evolution of $SO_2$ at the start of the refining. The soda-lime-silica glass has a composition comprising, in weight percentages:

| | |
|---|---|
| $SiO_2$ | 60-75%; |
| $B_2O_3$ | 0-5%; |
| $Al_2O_3$ | 0-10%; |
| MgO | 0-8% |
| CaO | 6-15% |
| $Na_2O$ | 10-20%; and |
| $K_2O$ | 0-3%. |

Due to the high content of $Na_2O$ and CaO (hence the expression "soda-lime"), this glass has a very low melt viscosity.

It is however known that the sulfates are not effective when it is a question of refining glass that has a high melt viscosity: since its decomposition temperature is low, the gaseous evolution of $SO_2$ occurs when the glass is too viscous. The expression "glass having a high viscosity" is understood to mean, within the sense of the present invention, glass for which the temperature corresponding to a viscosity of 100 poise (known as the "T log 2 temperature") is greater than or equal to 1480° C., such a viscosity being necessary to ensure that the bubbles rise at a reasonable rate. The T log 2 temperature of the soda-lime-silica compositions described above is around 1400° C. only.

Arsenic oxides or antimony oxides are usually used for refining these types of glass, but they have, however, the drawback of being toxic. These oxides are in addition incompatible with the process for forming flat glass known as the "float process" which consists in pouring the molten glass onto a bath of molten tin.

More recently, it has been proposed to use tin oxide as a refining agent, the latter being compatible with the float process.

The objective of the invention is to provide an improved refining method for glass having a high melt viscosity.

For this purpose, one subject of the invention is a method of refining glass for which the temperature corresponding to a viscosity of 100 poise (10 Pa·s) is greater than or equal to 1480° C., characterized in that sulfides are used as a refining agent.

This is because the inventors have discovered, completely unexpectedly, that sulfides make it possible to obtain very satisfactory refining results for glass having a high melt viscosity.

These results are all the more surprising because, according to the patent documents U.S. Pat. Nos. 5,069,826 and 3,589,885, soda-lime-silica glass may be refined using sulfides and because their refining mechanism is linked to the evolution of $SO_2$ at a temperature even lower than in the case of using sulfates. A person skilled in the art would therefore expect, on reading these documents, that the use of sulfides would be even less effective than that of sulfates. However, it is nothing of the sort, as the remainder of the text demonstrates.

Glass refined using this method advantageously has a "T log 2" temperature greater than or equal to 1500° C. or 1550° C., even 1600° C. or even 1650° C.

It may especially be:
glass compositions suitable for manufacturing substrates for liquid crystal displays, which comprise the following oxides in weight contents that vary within the limits defined below:

| | |
|---|---|
| $SiO_2$ | 58-76%; |
| $B_2O_3$ | 2-18%; |
| $Al_2O_3$ | 4-22%; |
| MgO | 0-8%; |

-continued

| | |
|---|---|
| CaO | 1-12%; |
| SrO | 0-5%; |
| BaO | 0-6%; and |
| $R_2O$ | 0-1% ($R_2O$ denoting alkali metal oxides), | and more particularly:

| | |
|---|---|
| $SiO_2$ | 58-70%; |
| $B_2O_3$ | 3-15%; |
| $Al_2O_3$ | 12-22%; |
| MgO | 0-8%, |
| CaO | 2-12%; |
| SrO | 0-3%; |
| BaO | <0.5%; and |
| $R_2O$ | 0-1%, | or else:

| | |
|---|---|
| $SiO_2$ | 58-72%; |
| $TiO_2$ | 0.8-3%; |
| $B_2O_3$ | 2-15%; |
| $Al_2O_3$ | 10-25%; |
| CaO | 2-12%; |
| MgO | 0-3%; |
| BaO | 0-6%; |
| SrO | 0-4%; |
| ZnO | 0-3%; and |
| $R_2O$ | 0-1% ($R_2O$ denoting alkali metal oxides), | these compositions, which are distinguished from soda-lime-silica compositions by a very low content of alkali metal oxides, have expansion coefficients below $35 \times 10^{-7}/°$ C., and a strain point above 650° C. EAGLE 2000® glass sold by Corning Inc. is an example of this family of glass;
  glass having low expansion coefficients used for applications as fire-resistant glazing:

| | |
|---|---|
| $SiO_2$ | 78-86%; |
| $B_2O_3$ | 8-15%; |
| $Al_2O_3$ | 0.9-5%; |
| MgO | 0-2%; |
| CaO | 0-1.5%; |
| $Na_2O$ | 0-3%; and |
| $K_2O$ | 0.7%, | an example of these types of compositions, which are distinguished from soda-lime-silica compositions by a low content of $Na_2O$ and CaO, is PYREX® glass sold by Corning Inc.;
  glass that can be used as a substrate for display screens known as "plasma" screens, especially having the following composition, which are distinguished from soda-lime-silica compositions by low contents of $Na_2O$:

| | |
|---|---|
| $SiO_2$ | 40 to 75%; |
| $Al_2O_3$ | 0 to 12%; |
| $Na_2O$ | 0 to 9%; |
| $K_2O$ | 3.5 to 10%; |
| MgO | 0 to 10%; |
| CaO | 2 to 11%; |
| SrO | 0 to 11%; |
| BaO | 0 to 17%; and |
| $ZrO_2$ | 2 to 8%. |

The glass refined according to the method of the present invention generally has a content of alkali metal oxides (especially of sodium oxide) that is less than or equal to 12%, or 10% and even 8%, or in certain cases an almost zero content.

The sulfides used within the context of the present invention are advantageously added to the batch materials before the melting step, preferably in an amount greater than or equal to 0.05% by weight relative to the final glass weight. This content is itself advantageously greater than or equal to 0.1%, or 0.3% and even 0.4% in order to ensure an optimal refining. Contents that are too high do not however provide any advantage over the quality of the final glass and may even sometimes modify the physical properties of the glass. They are therefore preferably limited to less than 2%, even 1%, or else 0.8%.

They are preferably sulfides for which the corresponding oxides form part of the glass composition so that the use of the sulfides does not introduce an element capable of modifying the properties of the glass into the composition. The introduction of alkali metal sulfides into a composition for LCD substrates which must not contain alkali metal oxides should, for example, be avoided. The sulfides used may be added in the form of a mixture of several different sulfides.

Sulfides of alkali metals ($Na_2S$, $K_2S$, $Li_2S$, etc.), of alkaline-earth metals (CaS, MgS, BaS, SrS, etc.) or of transition elements (ZnS, FeS, etc.) may be used in the context of the method according to the invention, alone or as a mixture. Zinc sulfide (ZnS) has proven particularly suitable, even for glass compositions that do not contain this oxide, especially for contents between 0.4 and 0.6% by weight.

The sulfides may also be provided in the form of blast-furnace slag or sulfide-enriched glass frit.

It is advantageous not to add sulfates to the batch materials in combination with the sulfides, as a degradation of the refining quality has been observed.

In order to further improve the refining quality obtained, it is particularly advantageous to add, in combination with the sulfides, an agent capable of oxidizing said sulfides, in particular an oxide of an element having several valencies. Among the oxidizing agents that can be used are, for example, cerium oxide (in $CeO_2$ form) or tin oxide (in $SnO_2$ form). Arsenic oxides or antimony oxides also have this advantageous property, but are not preferred due to their toxicity. Considering the coloring effect of the cerium oxide, tin oxide is preferred. These agents are preferably introduced in a weight content greater than or equal to 0.1%, or 0.2%, especially 0.3% and even 0.4% by weight relative to the final glass weight. Their content preferably does not exceed 2%, or 1% or even 0.8%. In the preferred case where tin oxide is used (and in particular when it is used in combination with zinc sulfide), the content of tin oxide introduced is preferably between 0.4 and 0.6%.

The inventors have discovered that during the implementation of the refining method according to the invention, the possible gaseous inclusions that remain trapped in the glass at the end of the melting step have a much higher diameter than those which remain when tin oxide, arsenic oxide or antimony oxide are used. These inclusions are therefore easily removable by promoting the high-temperature generation of gas that diffuses rapidly in the glass, for example by introducing, by bubbling into the mass of molten glass, a gas such as helium and/or by adding halides such as calcium or magnesium chloride to the batch materials before the melting step.

The refining temperature used is preferably less than or equal to 1750° C., or 1700° C. and even 1680° C.

Another subject of the invention is a method for manufacturing glass, especially substrates for liquid crystal displays, comprising a melting step, a refining step according to the invention and a forming step, the latter possibly, for example, being a step according to the float process that is well known to a person skilled in the art.

The method according to the invention is particularly suitable for obtaining various products or articles, which also constitute a subject of the invention.

Such an article is obtained from a glass for which the T log 2 temperature is greater than or equal to 1480° C., especially 1500° C. or 1550° C., or even 1600° C., and is characterized, in particular, by the fact that its chemical composition contains a sulfur content, expressed in parts per million (ppm) of $SO_3$, that is greater than or equal to 40 ppm, or even 60 ppm (i.e. 0.004 or 0.006% by weight relative to the final glass). The sulfur content is usually less than or equal to 0.5%, or 0.2% and even 0.1%.

To the knowledge of the inventors, no refining method using sulfur in any of its forms has been used or described for producing glass that has a high melt viscosity, especially substrates for liquid crystal displays, and consequently no substrate has been described which contains such an amount of sulfur in its composition.

It has also been revealed that the preferred embodiment in which tin oxide is used in combination with the sulfides is particularly well suited to obtaining other novel and advantageous articles.

These articles, obtained from a glass having a T log 2 temperature greater than or equal to 1480° C., especially 1500° C. and even 1600° C., and for which the composition comprises tin oxide, are characterized by a $[Sn^{2+}]/[\text{total Sn}]$ ratio greater than or equal to 0.6.

The tin may be present in the glass in two oxidation states: the reduced form $Sn^{2+}$ (valency 2) and the oxidized form $Sn^{4+}$ (valency 4). The $[Sn^{2+}]/[\text{total Sn}]$ ratio (denoted by R ratio in the remainder of the text) is defined by the molar ratio of the tin present in the glass in the reduced form of valency 2 to all the tin present in the glass. A high R ratio therefore corresponds to a high proportion of tin oxide present in the glass in its reduced form.

To the knowledge of the inventors, no refining method using tin oxide described in the prior art is capable of leading to such a high R ratio.

Moreover, the articles thus defined have, themselves, and independently of the method which has been able to be used to manufacture them, a series of advantages. This is because it has been revealed that a higher proportion of tin in the reduced form makes it possible to limit the risks of devitrification to cassiterite $SnO_2$. This particularly refractory crystalline form is capable of being formed in glass containing tin and of disrupting the glass-forming operations due to the creation of crystalline zones. In addition, the presence of tin mainly in the reduced form is advantageous when the molten glass is in contact with platinum. Platinum is frequently used in the glass industry due to its high melting point and high purity. The presence of molten glass in contact with platinum is however capable of generating gaseous inclusions in the glass due to electrochemical reactions. This is because the water dissolved in the glass may be dissociated to hydrogen ($H_2$) and oxygen ($O_2$) gases due to the catalytic action of the platinum. The hydrogen produced diffuses within the platinum, whereas the oxygen remains within the glass, giving rise to gaseous inclusions of small size that are particularly difficult to remove. Therefore, the inventors have been able to demonstrate that the presence of tin mainly in its reduced form makes it possible to absorb these inclusions via redox reactions and consequently to avoid, to a large extent, the generation of oxygen bubbles in contact with platinum.

For these various reasons, the R ratio is advantageously greater than or equal to 0.7, or even 0.75 and/or less than or equal to 0.9, or even 0.85. It has furthermore appeared that it is in these preferred R ratio ranges that the glass obtained has the best refining quality (therefore the least gaseous inclusions). This ratio may be obtained by suitable metering of the amounts of $SnO_2$ and of sulfides (especially ZnS). In the case where this metering is not adequate and leads to an R ratio outside of this preferred range, it is also possible to adjust this R ratio by adding a reducing agent (such as coke) or an oxidizing agent (such as, for example, a nitrate).

One preferred article is, in particular, a substrate for liquid crystal displays, the composition of which comprises the following oxides in weight contents that vary within the limits defined below:

| | |
|---|---|
| SiO2 | 58-76%; |
| $B_2O_3$ | 2-18%; |
| $Al_2O_3$ | 4-22%; |
| MgO | 0-8%; |
| CaO | 1-12%; |
| SrO | 0-5%, |
| BaO | 0-6%; and |
| $R_2O$ | 0-1%. |

The following examples illustrate the invention without however limiting it.

A glass composition comprising the following oxides in the weight contents defined below was melted starting from a mixture of batch materials and refined at 1650° C. for one hour:

| | |
|---|---|
| $SiO_2$ | 63.8%; |
| $Al_2O_3$ | 16.3%; |
| $B_2O_3$ | 11.3%; and |
| CaO | 8.5%. |

The glass having this composition had a T log 2 temperature of more than 1650° C.

For the comparative example C 1, no refining agent was added. The comparative examples C2, C3 and C4 were refined respectively using 0.2 wt % of sulfate, introduced in the form of gypsum ($CaSO_4$) and 0.5 and 1 wt % of tin oxide ($SnO_2$).

Example 1, according to the invention, was obtained by a process carrying out a refining step using zinc sulfide (ZnS) in an amount of 0.5% by weight relative to the final glass weight. For example 2, still according to the invention, an equivalent amount (0.5%) of tin oxide ($SnO_2$) was added to the mixture of batch materials in combination with 0.5% of zinc sulfide. In examples 2 to 6, the content of tin oxide added to the mixture of batch materials was set at 0.5% by weight, and the content of zinc sulfide varied from 0.3% (example 3) to 0.8% (example 6).

Table 1 below indicates, for each test, the amounts of zinc sulfide and/or tin oxide used, the degree of bubbles, expressed as the number of bubbles per $cm^3$, and the R ratio. The latter was measured by Mössbauer spectroscopy.

TABLE 1

|    | ZnS (%) | SnO$_2$ (%) | Degree of bubbles (/cm$^3$) | R |
|----|---------|-------------|-----------------------------|------|
| C1 | —       | —           | >1000                       | —    |
| C2 | —       | —           | 830                         | —    |
| C3 | —       | 0.5         | 160                         | 0.25 |
| C4 | —       | 1           | 30                          | 0.25 |
| 1  | 0.5     | —           | 125                         | —    |
| 2  | 0.5     | 0.5         | 7                           | 0.84 |
| 3  | 0.3     | 0.5         | 120                         | 0.6  |
| 4  | 0.4     | 0.5         | 60                          | 0.72 |
| 5  | 0.65    | 0.5         | 49                          | 1    |
| 6  | 0.8     | 0.5         | 65                          | 1    |

The comparative examples C1 and C2 show that the sulfate is a very poor refiner for this type of glass, the small improvement observed in terms of the degree of bubbles being largely insufficient.

Examples C3 and C4 show that a good-quality refining may be obtained with 1% SnO$_2$.

The addition of 0.5% of sulfides, in the form of zinc sulfide (ZnS) in Example 1 provided a substantial improvement relative to the use of sulfates. It was furthermore observed that the residual bubbles had a large size and could be easily removed by a minimum extension of the refining time. Comparison with the comparative examples C3 and C4 shows that ZnS is even more effective than SnO$_2$ when an identical amount is introduced.

The addition 0.5% tin oxide (SnO$_2$) in combination with 0.5% ZnS (example 2) also considerably improves the refining quality, since the glass obtained is almost completely free of gaseous inclusions.

For a tin oxide content of 0.5%, examination of examples 2 to 6 shows that the optimum, in terms of refining quality, lies between 0.4 and 0.6% zinc sulfide, more precisely around 0.5% zinc sulfide. This optimized range is correlated with an R ratio between 0.7 and 0.9, especially between 0.8 and 0.9, the effect of the zinc sulfide being to increase this ratio. It can be noted that refining with tin alone (comparative examples C3 and C4) only makes it possible to obtain R ratios of around 0.25. These low R ratios have the effect of increasing the risk of devitrification to cassiterite and of generating oxygen bubbles when the bath of molten glass is in contact with platinum.

As the present invention is described in the foregoing by way of example, it is understood that a person skilled in the art is able to carry out various variants of the invention without however going outside of the scope of the patent as defined by the claims.

The invention claimed is:

1. A method of refining glass which is not a soda-lime-silica glass, comprising:
   refining the glass which is not a soda-lime-silica glass in the presence of at least one sulfide and at least one agent capable of oxidizing the at least one sulfide comprising tin oxide;
   wherein:
   a temperature (T log 2) of the glass corresponding to a viscosity of 100 poise (10 Pa·s) is at least 1480° C.; and
   sulfates are not present during refining.

2. The method as claimed in claim 1, wherein the T log 2 temperature is at least 1500° C.

3. The method as claimed in claim 1, wherein the glass comprises the following oxides in weight contents within the limits defined below:

| SiO$_2$   | 58-76%;                                |
| B$_2$O$_3$ | 2-18%;                                 |
| Al$_2$O$_3$ | 4-22%;                                 |
| MgO       | 0-8%;                                  |
| CaO       | 1-12%;                                 |
| SrO       | 0-5%;                                  |
| BaO       | 0-6%; and                              |
| R$_2$O    | 0-1% (R$_2$O denoting alkali metal oxides). |

4. The method as claimed in claim 1, wherein the at least one sulfide is added to batch materials for preparing the glass before melting.

5. The method as claimed in claim 4, wherein the at least one sulfide is added in an amount between 0.1 and 0.8% by weight based on a total final weight of the glass.

6. The method as claimed in claim 1, wherein the at least one sulfide comprises zinc sulfide (ZnS).

7. A method for manufacturing glass, comprising:
   melting batch materials to obtain a molten composition;
   refining the molten composition by the method of refining glass as claimed in claim 1 to obtain a refined composition; and
   forming the refined composition.

8. The manufacturing method as claimed in claim 7, further comprising at least one of:
   introducing helium to the molten composition by bubbling; and
   introducing halides to the batch materials before melting the batch materials.

9. A method of refining glass, comprising:
   refining the glass in the presence of at least one sulfide;
   wherein:
   a temperature (T log 2) of the glass corresponding to a viscosity of 100 poise (10 Pa·s) is at least 1480° C.;
   sulfates are not present during refining; and
   the glass comprises the following oxides in weight contents within the limits defined below:

| SiO$_2$   | 58-76%;                                |
| B$_2$O$_3$ | 2-18%;                                 |
| Al$_2$O$_3$ | 4-22%;                                 |
| MgO       | 0-8%;                                  |
| CaO       | 1-12%;                                 |
| SrO       | 0-5%;                                  |
| BaO       | 0-6%; and                              |
| R$_2$O    | 0-1% (R$_2$O denoting alkali metal oxides). |

* * * * *